W. C. LYMAN.

CONDENSER HEAD FOR EXHAUST PIPES OF STEAM ENGINES.

No. 10,497. Reissued July 8, 1884.

Witnesses:
E. W. Schirach
H. Hackendorff

Wilfred C. Lyman
Inventor
By James H. Coyne
Atty

UNITED STATES PATENT OFFICE.

WILFRED C. LYMAN, OF CHICAGO, ILLINOIS.

CONDENSER-HEAD FOR EXHAUST-PIPES OF STEAM-ENGINES.

SPECIFICATION forming part of Reissued Letters Patent No. 10,497, dated July 8, 1884.

Original No. 298,698, dated May 13, 1884. Application for reissue filed June 16, 1884.

*To all whom it may concern:*

Be it known that I, WILFRED C. LYMAN, of Chicago, in the county of Cook and State of Illinois, have invented certain new and useful Improvements in Condenser-Heads for Exhaust-Pipes of Steam-Engines; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to provide a condensing-head for the exhaust-steam pipe of non-condensing steam-engines which will so condense the steam that the moisture in the steam that issues from the same will hardly be perceptible. This I accomplish by the use of the exhaust-head patented to me July 4, 1876, No. 179,581, and the addition thereto of certain auxiliary and sub deflectors arranged in such a manner as to present the utmost possible condensing-surface consistent with safety, by providing said auxiliary deflectors with upturned edges to collect and hold the liquids of condensation, which aids in the process of condensation of the steam, and by flaring outward the edges of the sub-deflectors.

Figure 1:
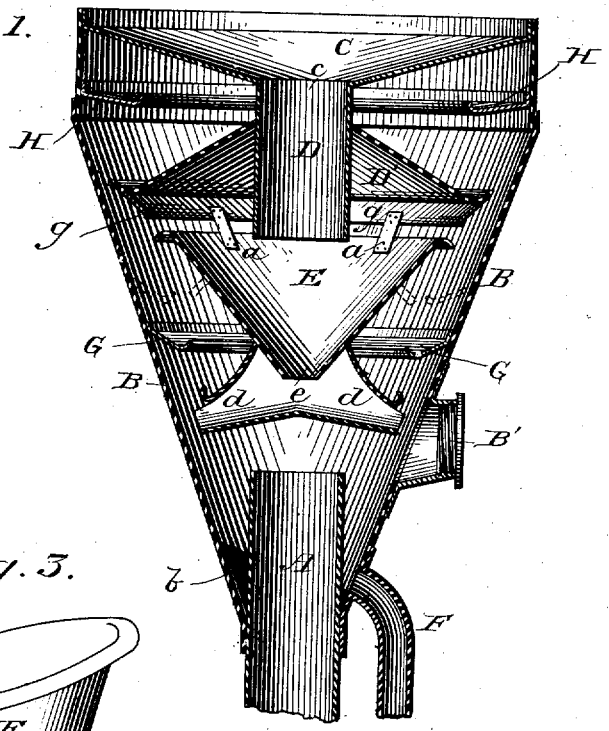
Figure 3:
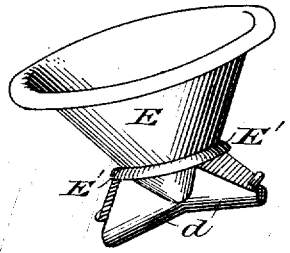
Figure 2:
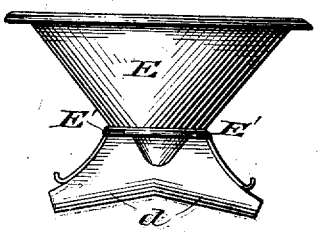
Figure 4:
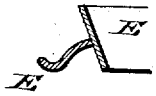

In the drawings, Figure 1 is a vertical section of my exhaust-head. Fig. 2 is a side elevation of the lower deflector, and Fig. 3 is a perspective view of the same. Fig. 4 is a detail view.

In the drawings, A represents the top end of a vertical exhaust-pipe leading from a non-condensing steam-engine.

B is an inverted-cone-shaped shell secured to said exhaust-pipe a suitable distance below the mouth of the same.

C is the head closing the top of the inverted shell B, which dips in toward the center, where it is provided with an opening, *c*, about the same diameter as the exhaust-pipe A.

Depending into the exhaust-head from and encircling the edges of the opening *c* is an escape-pipe, D.

D′ and E are the upper and lower deflectors, the former, D′, of which surrounds and depends from the escape D, and the latter, E, of which is inverted, and is suspended a little below the upper deflector by means of the straps *a a* from the inner contiguous surface of the shell B or said upper deflector, in the manner shown. The relative positions of the upper and lower deflectors are such that there is a suitable space left between their contiguous rims or edges, through which the steam escapes on its way to the escape-pipe D.

In the bottom of the lower deflector is an opening, *e*, by means of which the products of condensation are drained from the chamber formed by said upper and lower deflectors into the conduits *d d*, which, being placed diametrically over and above the mouth of the exhaust-pipe A, carry the condensed steam beyond the circumference of the current of steam issuing therefrom to the incline *b*, made just above where the shell B is connected to the pipe A, which receive and convey the products of condensation to the drip-pipe F, by which it is carried off. These conduits *d d* form a water-shed for the liquids they receive, and are therefore connected. They are soldered or riveted to the sides of the lower deflector, as shown in Figs. 2 and 3. In the original head the upper edges of the side walls of the conduits are flanged or curved outward, and the outer edges of the upper and lower deflectors are curved, respectively, upward and downward, to assist the process of condensation.

In describing my improved head I have thus far confined myself to the aforesaid patented head. In this original head the current of steam as it issues from the exhaust-pipe is deflected outward toward the sides of the shell by the lower deflector; thence it is driven either by its own force or that of the following pulsation of steam to the chamber above and around the upper deflector, from which it escapes into the chamber between the two deflectors, and then out of the escape-pipe.

My improvements consist, principally, in the additional means for increasing the condensing-surface, which are placed directly in the path of the escaping current without creating back-pressure, and yet keep the steam within the head as long as possible, in order to deprive it of as much moisture as possible.

As hereinbefore stated, in the original head the top edges of the side walls of the conduits *d* were flanged outward. In my improved head I prefer to roof over the conduits and extend the side edges of the roof of the same beyond the sides of the conduits, curving the same upward slightly, so that the products of condensation deposited thereon may drain down the incline of the same into the conduits near their mouths.

On the same horizontal plane with the point where the roofs of the conduits *d* are connected to the lower deflector is a downwardly and outwardly projecting flange constituting a continuation of that part of the roof of the conduit *d* which extends beyond the side wall of the same. This flange describes a segment around the lower deflector from one conduit to the other, and the whole forms a sub-deflector, E′. The lower edge of the flange of this sub-deflector is slightly curved outward, so as to aid the globules of water formed or deposited thereon, and prevented, to a very large extent, from dropping off the same by the continuous upward current of steam, to seek the roofs of the conduits, where, without obstruction, they can drain off. If desired, I do not consider it beyond the scope of my invention to add one or more sub-deflectors which shall encircle said lower deflector between the sub-deflector E′ and the upper curved edges of the said lower deflector, E.

Projecting inward and downward from the shell B, a little above the horizontal plane of the said sub-deflector E′, is the auxiliary deflector G, having its outer edges curved upward, so as to hold the products of condensation. This auxiliary deflector serves to anticipate the outskirts of the upward current of steam issuing from the exhaust-pipe, and that which has been deflected downward and outward by deflector E and its sub-deflector. The water held by the upturned edges of this deflector G aids the process of condensation by collecting the moisture coming in contact with it. There may also be one or more of these auxiliary deflectors G; but in this event it is deemed best they should correspond in numbers and position to the additional sub-deflectors E′.

Projecting inward and slightly downward from that part of the shell B which borders the chamber above and around the upper deflector, D′, is an auxiliary deflector, H, having its edges upturned to collect and hold the condensed steam for the same purpose as those of the auxiliary deflector G. This auxiliary deflector serves to break the regularity and symmetry of an inward evolute the current of steam would otherwise make, and furnishes more condensing-surface.

Projecting downward and inward from the curved portion of the edges of the upper deflector, D′, is a sub-deflector, *g*, the lower edges of which are slightly flared outward. This deflector narrows the opening between the contiguous edges of the upper and lower deflectors, and is so arranged that the current of steam may be guided down into the lower deflector, to carry the remaining moisture and globules of condensed steam formed on the flared lower edge of the sub-deflector *g* through the opening *e* of the deflector E into the conduits *d*, by which they are carried off.

Special attention is directed to the curvature or flaring outward of the sub-deflector *g* and flange of the sub-deflector E′, which materially improves the function which they are designed to perform, as by references to the foregoing description will be evident.

I have mentioned the fact that a hand-hole, B′, is made in the shell B. As it is evident that the purpose designed for it is to cleanse the interior of the head, I do not deem it a departure from my invention if two hand-holes instead of one are used—viz., one in the side shell and another in the head C of the exhaust-head. Moreover, I do not wish to be confined to the exact construction of the head shown, as it is obvious that it can be made to suit the position.

I do not wish to be understood as herein confining myself to the use of deflectors D′ and E having curved outer rims or edges, for my improvements can operate, so far as they individually are concerned, just as well with deflectors not having curved outer rims or edges as with deflectors having them. Moreover, it is not absolutely necessary that the auxiliary deflectors G and H should have upwardly-curved rims or edges, for, although such construction is preferred, said deflectors are operative without such conformation.

What I claim as new, and desire to secure by Letters Patent, is—

1. The combination of the deflector E, sub-deflector E′, having outwardly-flared edges, and the shell B, substantially as set forth.

2. In an exhaust-head, the combination of the shell B, deflector E, sub-deflector E′, and auxiliary deflector G.

3. In an exhaust-head, the combination of the shell B and deflectors D′ and E with the auxiliary deflector G, as set forth.

4. The combination of the shell B and the upper deflector provided with the sub-deflector *g*, the lower edges of which are slightly flared outward, with the lower deflector, substantially in the manner set forth.

5. The combination, in a condensing-head for steam-exhaust pipes, of the shell B, the upper deflector provided with the sub-deflector *g*, as described, the lower deflector provided with the sub-deflector E′, and the auxiliary deflector G.

6. The combination, in a condensing-head for exhaust-steam pipes, of the shell B, upper deflector provided with the sub-deflector *g*, the lower deflector provided with the sub-deflector E′, and the auxiliary deflectors G and H.

7. In an exhaust-head, the combination of the upper deflector, the lower deflector, E, provided with a sub-deflector, E′, and the shell B, as hereinbefore described.

8. In an exhaust-head, the combination of the shell B, the upper deflector, the lower deflector, and the auxiliary deflector H, substantially as specified.

In testimony that I claim the foregoing as my own I hereunto affix my signature in presence of two witnesses.

WILFRED C. LYMAN.

Witnesses:
JAMES H. COYNE,
FRANK D. THOMASON.